UNITED STATES PATENT OFFICE.

JAMES DUFF, OF OSWEGO, NEW YORK.

METHOD OF PRODUCTION OF STARCH, DEXTRINE, GLUCOSE, SIRUP, AND GRAPE-SUGAR.

SPECIFICATION forming part of Letters Patent No. 270,210, dated January 9, 1883.

Application filed February 27, 1882. (No specimens.)

*To all whom it may concern:*

Be it known that I, JAMES DUFF, of Oswego, Oswego county, New York, have invented a new and Improved Method for the Production of Starch, Dextrine, Glucose, Sirup, and Grape-Sugar, of which the following is a specification.

The object of my invention is to increase the yield of starch, and to preserve the cellulose or fibrous material and increase the quantity of dextrine, glucose, sirup, and grape-sugar, or spirits, beer, or vinegar produced from a given quantity of Indian corn, and by my method of procedure I can dispense entirely with the starch tables or trays now in use and the labor involved by their use in the manufacture of dextrine, glucose, grape-sugar, &c.

In the manufacture of starch, dextrine, glucose, sirup, and grape-sugar, &c., from Indian corn the usual custom is to soak the corn in warm water, then grind it in a burr-mill with water. As the ground mass leaves the mill it is passed either in or upon a fine sieve or separator, which admits of the passage of the starch-liquor and retains most of the hulls and some of the germ and other matter. The hulls, germ, and other matter that are retained by the sieve or separator pass off as feed or waste. The starch-liquor which passes through the meshes of the sieve or separator is run into tubs or vats, where it is allowed to stand at rest for the purpose of permitting the mass to settle. Then the water is withdrawn and the mass is agitated, generally adding fresh water, and is treated with caustic alkali or other chemical agent, and is kept in agitation for a sufficient time for the caustic alkali or chemical agent to properly act. Then the starch is separated from the other matter with which it is associated, generally by running the starch-liquor in a comparatively thinned condition over starch tables or trays. In the passage of the liquor the starch-deposits and the cellulose or fibrous matter, together with the gluten, oil, &c., passes off the lower end of the table and the cellulose or fibrous matter is lost, going into the feed or waste. Some of the finer granules of starch pass off in company with the other matter. The starch is then removed to a tub or tubs, where it is mixed with water and washed to further purify it and to remove the chemical agent. If the aim is to produce commercial starch, then it may be further purified and then dripped and dried in the usual manner; or if dextrine, glucose, or grape-sugar, &c., be desired, then it may be placed in a converter and treated in the customary manner for the production of those articles.

In the manufacture of dextrine, &c., from corn the cullulose of fibrous matter is not objectionable; but it is desirable to retain it for the reason that, this matter being chemically almost identical with starch, it is readily convertible into saccharine matter, and thus the yield out of a given quantity of corn is materially increased.

The following is my method: Indian corn may be soaked in any ordinary way and ground. As the ground corn leaves the mill I cause it to pass either onto or into a sieve or separator of such mesh as to pass the heart or starch-yielding portion of the corn and retain the greater part of the hulls and some portion of the germ. At the same time I sprinkle it plentifully with water in order to wash off the meal adhering to the hulls, as well as to more thoroughly wash the meal and starchy matter through the meshes of the sieve. All that passes the sieve I lead into a tank or tanks, and when a tank is full I agitate the mass until it is well mixed. I then let it stand at rest in order to allow the coarse matter to settle to the bottom. When it is settled sufficiently, which can be ascertained by withdrawing some of the starch-liquor from plugs or faucets in the side of the tank at intervals, I quickly withdraw the liquor down to the coarse portion or settlings. After the withdrawal of the top liquor I agitate the remaining mass and pass it into a second mill or reducing agent to effect a further reduction of the starchy portion of the meal which escaped a proper reduction in the first grinding. As the reground mass leaves the mill I pass it, with water, into or onto another sieve or separator of such mesh as to pass through all of the reduced starchy matter and retain only the unreduced pieces of hull and germ which had passed through the first sieve, and meanwhile sprinkle thoroughly with water to facilitate the sifting and to wash the meal from the hulls and germ. What is retained by these sieves passes off as feed or waste. The starch-liquor passing the second sieve may pass into a separate tub and be there settled out, and the residue, if desired, may be reground in a third mill, and from thence pass into another sieve of finer mesh than previously used and be again sifted, if desired. This operation of grinding, sifting, and settling out may be continued as much as deemed necessary; or the starch-liquor from the second sieve may pass into the tub receiving that from the first sieve, and be there settled out; or the starch-liquor from each sieve may be received in separate tubs, or all pass into one. In either case the starch-liquor is allowed to stand to permit any objectionable matter in it to settle and the top liquor to be drawn off. The starch-liquor so drawn off is conducted into tanks and allowed to stand a sufficient time to permit the contained matter to deposit, and then the water is drawn off. After the water is withdrawn I treat the mass which remains in the tub with caustic alkali or other chemical agent for the purpose of acting on the gluten, oil, &c., agitating it to insure a thorough action. After the chemical agent has acted water is added to thin up the mass, and then it is allowed to stand and settle, and when the starch and cellulose or fibrous matter have deposited, the water containing the gluten, oil, &c., is drawn off and fresh water is added and well mixed with the deposited matter and again settled and drawn off. Further washing may be resorted to if necessary. Thus the starch and cellulose and fibrous matter are preserved together and freed from the presence of the gluten, oil, &c., and other objectionable matter. The resulting mass of starch and cellulose is treated and converted into dextrine, glucose, &c., with acid or other converting agent in the usual manner.

For making starch I take the liquor, after it has been acted on by the alkali or chemical agent, and pass it over starch-tables, or separate it in the usual manner, and the starch is then washed, dripped, and dried as usual. In this case the cellulose or fibrous matter passes off with the other waste, as, on account of its very light floating or flocky consistence, even the light current of a starch-table will carry it off; or after receiving starch-liquor as ordinarily produced into the tub or tank I allow it to stand and settle and draw off the water, as above described, and then apply the alkali or chemical agent in the usual quantity, the amount depending somewhat upon the character of the grain and the condition of the starch-liquor, and agitate it to cause the chemical to act thoroughly. After such action fresh water is added and the mass thinned down to about 4° or 5° Baumé, and after being well mixed the liquor remains at rest, and as there are usually some finely-reduced pieces of hull, germ, and horny particles of the grain accompanying the liquor such water will settle in a short time. After it has settled I quickly draw off the top liquor containing the starch and cellulose or fibrous matter in suspension, together with the dissolved gluten, oil, &c., leaving in the bottom of the tub all of the objectionable matter. As some of the starchy matter and cellulose settles and deposits also to the bottom of the tub, I may then add more water to it, agitate it, and repeat the operation of drawing off the top liquor until all of the starchy matter and cellulose or fibrous matter is eliminated from the objectionable matter; or the settlings and deposits of several tubs may be added together and treated and washed as described. After the first drawing off of the top liquor, if it is thought desirable, what remains in the tub may be thinned up to a proper degree and caused to pass over starch tables or trays for the purpose of procuring the small portion of starch intermixed with it, allowing it to deposit thereon, in which case most of the objectionable matter referred to, together with the remaining cellulose, will pass over the end of the tray. The starch and cellulose that are obtained by withdrawal of the top liquor, and the small portion of starch from the tables, if those are used, are then put together, or may be, and then washed with water to remove the alkali, &c, and the starch and cellulose matter so obtained treated and processed in the usual way to produce dextrine, glucose, &c.

Instead of proceeding as in the last subdivision described, the raw starch-liquor, as it is received in a tub from the mill, may be agitated and then allowed to stand and settle and deposit the objectionable matter and the mass washed by the addition of more water, as above shown; or the residue, after the first drawing off, or after any subsequent drawing off, may be treated with alkali and passed over tables or trays to collect the starch that may remain in the residue. In passing the starch-liquor over the tables some of the starch, and practically all of the cellulose or fibrous matter, are carried of in the water, and to preserve these what passes the end of the starch-tables is conducted into a tank and settled, and the top liquor, carrying with it the starch and cellulose or fibrous matter in suspension, run into a tub and treated and processed as shown. The withdrawn liquor from the first and subsequent drawings off can all be brought together in a tank or tanks, reduced with water, if necessary, and then treated with alkali and agitated until well mixed, then allowed to stand to settle the starch and cellulose, and the top liquor, holding in suspense the dissolved gluten, oil, &c., drawn off and the residue washed to remove the alkali, together with the remaining gluten, &c., as often as is deemed necessary, and after such washing the remaining starch and cellulose treated and processed in the usual way to produce starch, or dextrine, glucose, &c.; or, instead of conducting the starch-liquor which passes the first sieve direct into a tank or tub, I can pass it into or onto a fine sieve immediately succeeding the first sieve, and I then pass that portion of the mass retained by the second sieve into a mill and regrind it and sieve it, repeating the regrinding and sieving as often as desired for the purpose of effecting a complete reduction of the starch-yielding matter; or, after passing over the first fine sieve, I may pass it into a series of mills or grinding agents without intermediate sieves or separators; or the matter thus settled out or partially settled out may be boiled or cooked, then reground, if necessary, then passed into a converter, where it may be boiled with or exposed to a saccharifying agent in such proportions and for such time as will simply make the first transformation or conversion of the starch into dextrine. The accomplishment of this can be readily ascertained by proper tests. Then the mass may be filtered to remove the objectionable matter, and the dextrine solution may be converted in the usual manner into glucose, &c.

The foregoing paragraph is introduced to show some of the alternative modes of treatment of the mass and starch-liquor to accomplish the result.

I am aware that efforts have been made heretofore to obtain and preserve the cellulose or fibrous material from Indian corn by depositing it upon the ordinary starch-tables in the ordinary way for procuring starch; but I am not aware that any one has ever attempted to save it by my method, or anything similar to it.

I am also aware that the cellulose or fibrous material in potatoes has been preserved in starch-making, and that very easily, on account of the quantity being so much greater and of its specific gravity being so much heavier than that of the cellulose in Indian corn, so that the cellulose from potatoes can readily be retained.

I am aware, also, that it is old to first soak and grind grain by a succession of mills or rollers with intermediate sieves or separators, in or upon which the whole mass of unreduced starchy matter, together with the hulls, germ, &c., is retained for passage to the succeeding grinding or reducing agent, and that it is old to subject the soaked and coarsely-ground particles to roller-pressure or beaters and subsequent separation to facilitate a complete reduction of the starch.

I am also aware that it is old to first pass the grain as it leaves the mill upon a fine sieve or separator to screen out the reduced starchy matter and to retain and carry the coarser pieces, consisting of meal, hull, germ, &c., into a second coarse sieve, so as to separate the starch-bearing particles and regrind them by returning them to the first mill in company with the grind-water; but I do not claim such processes. A part of my invention consists in conveying the soaked and ground corn in or upon a coarse sieve or separator first, thus allowing the starch-bearing portion to go through the meshes of the sieve and the hulls and part of the germ to be retained and pass off as refuse. I then pass the starch-liquor and accompanying matter in or upon a fine sieve for the purpose of retaining for further grinding such matter as requires it to effect a complete reduction of the starchy matter and the fibrous material or cellulose of the corn, repeating the grinding or sieving, as above described, or until a thorough reduction is effected. The starch-liquor thus obtained may be treated in the usual manner for procuring the starch; or the starch-liquor may be treated as above described for retaining the cellulose or fiber in company with the starch; but I am not aware that any person has ever actually preserved the cellulose from corn in making dextrine, &c., and at the same time freed the cellulose and starch from the presence of the hulls and germ, oil, albuminous matter and gluten, which I do.

What I claim as my invention, and desire to secure by Letters Patent, is—

1. The method, substantially as herein described, of treating grain for the purpose of obtaining an increased yield of starch, dextrine, glucose, sirup, grape-sugar, &c., and for the preservation of the cellulose, and thereby increasing the yield of dextrine and saccharine matter, which method consists of the following steps in combination: first, soaking and grinding the grain with water; second, sieving out or separating the hulls and other objectionable matter from the starchy portion and passing the wash-water and starch-yielding particles which go through the sieve into a tank or tanks; third, agitating the mass and allowing it to stand there and settle the coarse matter; fourth, drawing off the top liquor into a reservoir; fifth, regrinding the mass remaining in the tanks; sixth, passing the reground mass upon or into a sieve or separator and taking out the unreduced pieces of hull and objectionable matter remaining, adding water, and passing the wash-water and starchy portions into a tank; seventh, agitating and allowing it to stand and settle the coarse matter and drawing off the starch-liquor into a reservoir; eighth, allowing the starch-liquor to settle and drawing off the water; ninth, agitating and treating the starchy mass remaining with caustic alkali or chemical agent, washing with water, settling, and withdrawing the glutinous top liquor, or separating the starch at the proper time in the usual manner, or converting the mass of starch and cellulose into dextrine, glucose, sirup, or grape-sugar by any of the usual processes.

2. The herein-described improvement in the process of manufacturing starch, dextrine, glucose, &c., from corn, consisting of the successive grinding and settling out and drawing off to effect a complete reduction of the starch-yielding and interior portions of the grain, with separations or siftings to remove the hulls, &c., all to obtain and preserve the cellulose or fibrous material with and to increase the yield of starch, dextrine, &c., substantially as described.

3. The herein-described improvement in the process of manufacturing dextrine, &c., from corn, consisting of the successive grinding, separating, and settling out, with intermediate cooking, converting, or partial converting and filtration to effect a complete reduction of the mass, remove the objectionable matter, obtain and preserve the cellulose or fibrous material and convert and transform it into dextrine, &c., substantially as described.

4. The herein-described improvement in the process of manufacturing dextrine, &c., from corn, consisting of the preservation for use of the cellulose or fibrous material with the starch, when freed or practically freed from the presence of the hulls, germ, oil, albuminous matter, and gluten, substantially as and for the purposes set forth.

5. The herein-described improvement in the process of manufacturing starch, dextrine, glucose, &c., from corn, consisting of separating the hulls and parts of the germ from the starch-yielding matter by first passing the corn as it is ground, with water, in or upon a coarse separator, and then running the starch-liquor that passes through the coarse separator in or upon a fine sieve or separator, then regrinding the starchy matter retained by the fine separator, then running the reground starchy matter, with water, in or upon a coarse separator, but not so coarse as the first coarse separator, and repeating the grinding and separating as often as may be necessary to effect a complete reduction of the starch-yielding matter.

6. The herein-described improvement in the process of manufacturing starch, dextrine, glucose, grape-sugar, &c., from corn, consisting of first separating the hulls from the starch-yielding matter, after being ground with water, then passing the starch-liquor in or upon a fine separator, then regrinding the starchy matter retained by the fine separator, then passing the reground mass, with water, in or upon a fine separator and regrinding the matter retained by the separator, and so continuing to regrind as often as may be necessary, each successive mill being adjusted so as to grind finer than the preceding one, substantially as and for the purposes set forth.

7. The herein-described improvement in the process of manufacturing starch, dextrine, glucose, grape-sugar, &c., from corn, consisting of regrinding the starchy matter, after separating the hulls, in one or more additional mill or mills or reducing agents, and with or without intermediate separators between the succeeding reductions, substantially as and for the purposes set forth.

In witness whereof I have hereunto set my hand this 17th day of February, 1882.

JAMES DUFF.

Witnesses:
C. W. SMITH,
J. A. NOTTINGHAM.